United States Patent [19]
De Wit et al.

[11] Patent Number: 5,644,191
[45] Date of Patent: Jul. 1, 1997

[54] COLOR DISPLAY TUBE HAVING AN EXTERNAL MAGNETIC SHIELD

[75] Inventors: Hendrik J. De Wit; Willem Schouten, both of Eindhoven, Netherlands

[73] Assignee: U.S. Philips Corporation, New York, N.Y.

[21] Appl. No.: 330,647

[22] Filed: Oct. 28, 1994

[30] Foreign Application Priority Data

Oct. 29, 1993 [BE] Belgium ................. 09301184

[51] Int. Cl.$^6$ ................. H01J 29/86
[52] U.S. Cl. ................. 313/402; 313/313
[58] Field of Search ................. 313/313, 402

[56] References Cited

U.S. PATENT DOCUMENTS 4,710,669  12/1987  Adamski et al. ............ 313/402
4,845,402  7/1989  Smith ............ 313/422
4,853,790  8/1989  Dickie ............ 313/402
5,194,776  3/1993  Chevalier ............ 313/402

FOREIGN PATENT DOCUMENTS 58104591  6/1983  Japan.

OTHER PUBLICATIONS

A. Haga et al, "A new type of magnetic shield (abstract)", J. Appl. Phys. 64 (10), Nov. 15, 1988, p. 5706.

*Primary Examiner*—Nimeshkumar Patel
*Attorney, Agent, or Firm*—John C. Fox

[57] ABSTRACT

Color display tube having a display screen with a pattern of phosphor elements. To reduce mislanding errors of the electron beams, particularly in the y-direction, the color display tube is arranged within an external magnetic shield which is constituted by an open arrangement (frame) of bars of a soft-magnetic material. The bars jointly constitute, for example the ribs of a block.

10 Claims, 2 Drawing Sheets

COLOR DISPLAY TUBE HAVING AN EXTERNAL MAGNETIC SHIELD

The invention relates to a colour display tube having an envelope and comprising means for generating electrons, a transparent display window, a display screen having a pattern of phosphor elements on the inner surface of the window and means for directing electrons onto the display screen.

Such a colour display tube may be, for example of the box-shaped type or of the type in which the display window is connected by means of a funnel-shaped envelope portion having a neck portion accommodating the means for generating electrons, a colour selection means arranged opposite the display screen and an internal magnetic shield arranged within the funnel-shaped portion and having two long side walls parallel to the long axis of the display screen, (the x-axis), two short side walls parallel to the short axis of the display screen (the y-axis), and a gun-sided open end which extends transversely to the longitudinal axis of the display tube.

A colour selection means is herein understood to mean, for example, an apertured shadow mask sheet or a wire mask.

In a (colour) display tube the earth's magnetic field deflects the electron paths, which without any measures may be so large that the electrons impinge upon the wrong phosphor element (mislanding) and produce a discolouration of the picture. Particularly the component of the earth's magnetic field in the axial direction of the display tube (referred to as the axial field) plays an important role in this respect, which may become manifest as a lack of colour or even as a colour impurity in the corners of the display screen.

A known measure of reducing mislandings due to the earth's magnetic field is the use of an internal magnetic shield which, together with the similarly ferromagnetic shadow mask, partially shields the earth's magnetic field. The shape of such a shield roughly follows the contours of the envelope of the display tube. This means that the (funnel-shaped) shield has two long, trapezoidal sides which are parallel to the long axis (the x-axis) of the display screen and two short, trapezoidal sides which are parallel to the short axis (the y-axis) of the display screen.

The short sides of the shield are often provided from the gun-sided aperture (17, FIG. 3) with triangular recesses (18, 19, FIG. 3) so as to reduce mislanding in the corners due to the axial field. If relatively small tubes and a relatively large pitch of the elements of the phosphor pattern on the display screen are used, an acceptable result may be achieved in this way. However, if larger display tubes and/or a smaller pitch of the phosphor elements are used, this type of solution does not always ensure a sufficient colour purity. To (further) reduce the influence of the earth's magnetic field, an external shield is sometimes provided, either or not in combination with an internal shield. For this purpose, a metal cover is arranged in the tube with a more or less tight fit. See, for example U.S. Pat. No. 4,845,402.

It is an object of the present invention to provide a shielded colour display tube which effectively reduces the detrimental effect of the earth's magnetic field on colour purity without an external cover being necessary.

According to the invention, a colour display tube of the type described in the opening paragraph is therefore characterized in that it is positioned within a volume which is defined by an open arrangement or frame of bars of a soft-magnetic material.

The cross-sections of the bars and the magnetic permeability of the bar material may be chosen to be such that a given shielding effect is achieved.

In a simple embodiment the bars, whose ends are interconnected, are arranged, for example in such a way that they constitute the ribs of a block. Then they may be arranged, for example against the walls of the cabinet of a TV set or a monitor.

In a complicated embodiment they may define a block whose sides are constituted by networks or grating of bars.

When the colour display tube is switched on, it is important to demagnetize the arrangement of soft-magnetic bars (preferably by means of an alternating field decreasing in strength with respect to time) so as to make use of the high anhysteresis permeability. For this purpose, a demagnetization coil which can be connected to an energizing circuit may be used.

The larger the volume which is defined by the arrangement of bars, the more magnetic flux of the colour display tube can be captured.

These and other aspects of the invention will be apparent from and elucidated with reference to the embodiments described hereinafter.

In the drawings

Figure 1A:
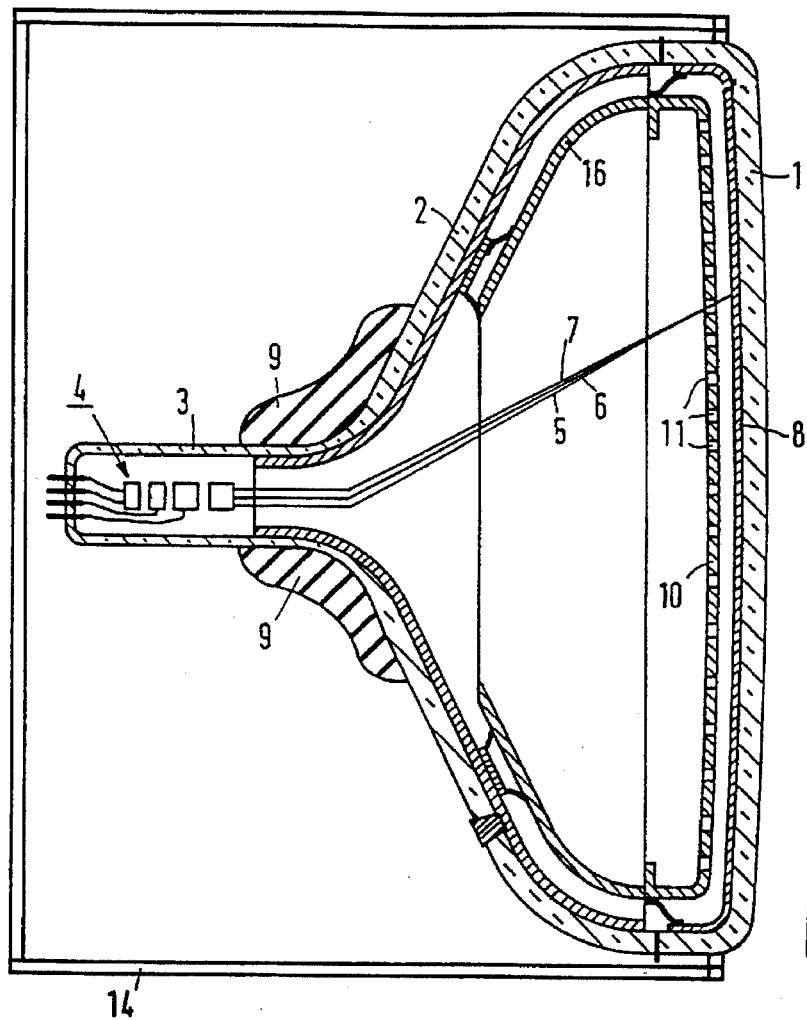
FIG. 1a is a horizontal cross-section of a colour display tube having an external shield.

The display tube shown in a horizontal cross-section in FIG. 1a comprises a glass envelope consisting of a display window 1, a cone 2 and a neck 3. The neck 3 accommodates an electrode system 4 with three electron guns for generating three electron beams 5, 6 and 7. The electron beams are generated in one plane (here the plane of the drawing) and are directed onto a display screen 8 arranged internally on the display window 1 and consisting of a large number of red, green and blue luminescing phosphor elements coated with an aluminium backing. On their path to the display screen 8, the electron beams 5, 6 and 7 are deflected across the display screen 8 by means of a deflection coil system 9 arranged coaxially around the tube axis and pass a colour selection electrode 10, here consisting of a metal plate with apertures 11. The three electron beams 5, 6 and 7 pass the apertures 11 at a small angle and consequently impinge on phosphor elements of one colour only. A funnel-shaped magnetic shield 16 is arranged within the glass envelope.

Figure 1B:
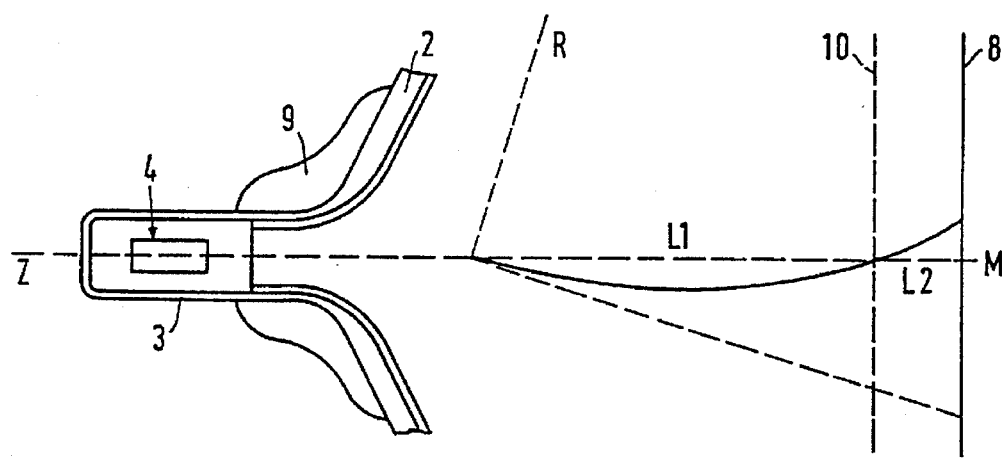
FIG. 1b shows diagrammatically the cause of mislanding.

In a colour display tube electrons pass through apertures of a shadow mask and impinge upon a phosphor. The position of the phosphors is optimal for one tube orientation in one given earth's magnetic field (earth location). For a different orientation or earth's magnetic field, the electron impinges upon another spot on the shadow mask. This causes a distortion of the picture which is particularly detrimental in colour monitors. Moreover, the electron reaches the mask at a different angle. If it passes through an aperture, it is incident with a given mislanding M on the screen under the influence of a field transverse to its direction of movement. See FIG. 1b. If this mislanding is too large, the wrong phosphor element may even be reached, thus causing colour errors.

A computation of the extent of mislanding for the case where the earth's magnetic field is not compensated for at all will be given hereinafter. In a homogeneous field having a size B the electron describes a path having a radius R which is given by $R=mv_o/eB$, with m, $v_o$ and e denoting mass, velocity and charge, respectively, of the electron. At an earth's magnetic field of $5*10^{-5}T$(~½ gauss), an electron velocity $v_o$ of $10^8$ m/sec and $e/m=1.76\times 10^{11}$ C/kg, this results in R=11.4 m. A simple geometrical consideration then yields for the mislanding M:

$$M \approx \frac{l_1 \cdot l_2 \cdot eB}{2mv_O}$$

in which $l_1$ is the distance between the electron source and the shadow mask and $l_2$ is the distance between the shadow mask and the screen. It is important to reduce the mislanding as much as possible because this may immediately lead to, for example a greater brightness of the tube. If the tube is larger, $l_1$ and $l_2$ both increase, so that the mislanding will become quadratically larger.

The direction of the disturbing magnetic field in the tube depends on the location and orientation of the apparatus. To adapt the magnetization of the shield to the field which is present in a given situation, this shield is demagnetized by means of a decreasing alternating field whenever the tube is switched on.

The shields necessarily have a gun-sided open end. This means that there can be no question of a total shielding.

The invention is based on the surprising recognition that a considerable decrease of mislandings due to the earth's magnetic field can be achieved by placing the display tube in an open arrangement (frame) 14 (FIG. 1); 15 (FIG. 2) of bars of a soft-magnetic material.

Figure 2:
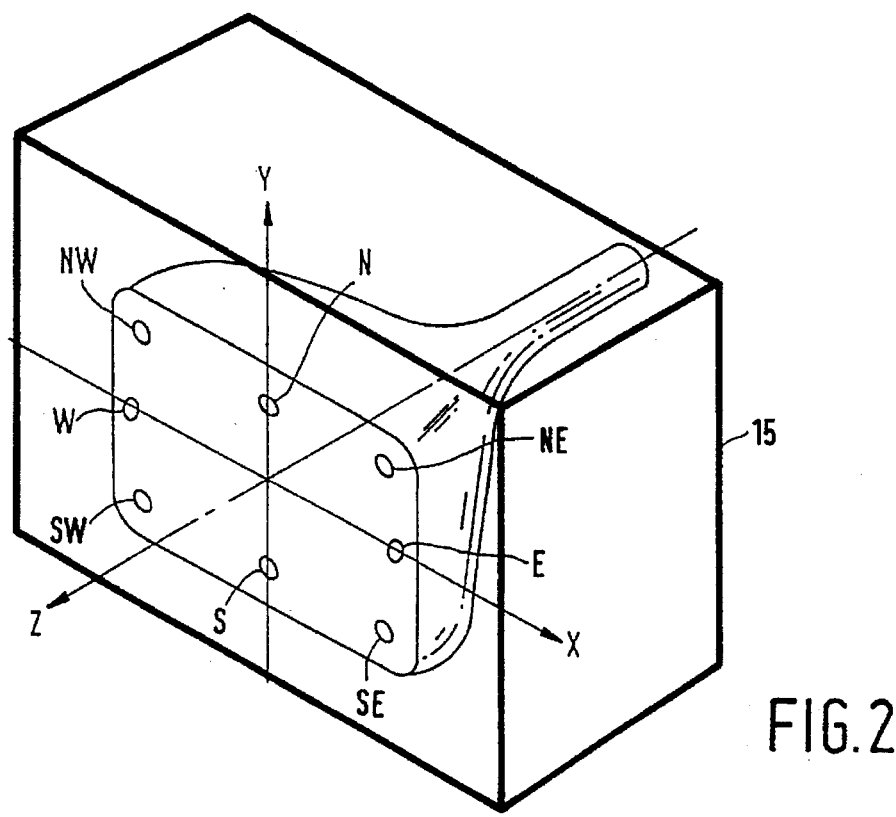
FIG. 2 is a perspective elevational view of a colour display tube having an external shield, and, indicated therein, a system of axes and the positions on the display screen where beam mislandings are measured.
Figure 3:
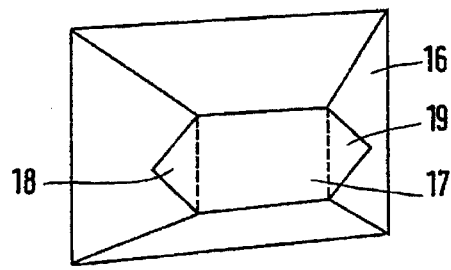
FIG. 3 is a perspective elevational view of an embodiment of a prior-art internal shield.

To simplify the explanation, FIG. 2 shows a definition of a system of axes in a display tube and of locations on the screen. Here, only the component of the earth's magnetic field in the z-direction is considered, which is the field known as the axial field.

The Table states computed values of the mislandings of the electrons in the north-east corner (NE) of the display screen for a 66 inch FS tube having an acceleration voltage of 27.5 kV. A frame comprising (12) bars having a cross-section of 5×5 mm and a magnetic permeability of $1\times 10^6$ has been taken as an example.

Dimensions of the frame: in the x-direction 570 mm, y-direction 430 mm, z-direction 240 mm. Dimensions of the mask: 522×401 mm, distance between the mask and the edge of the internal shield: 180 mm. The Table below states the mislandings in the north-east corner of the screen at a mask-screen distance of 10 mm, a deflection point-mask distance of 278 mm with and without an external frame.

| field direction | field (A/m) | without $M_x$ (μm) | without $M_y$ (μm) | with $M_x$ (μm) | with $M_y$ (μm) |
|---|---|---|---|---|---|
| lateral | 15 | −4.8 | −21.1 | −2.5 | −11.0 |
| axial | 15 | −4.5 | 17.6 | −2.3 | 12.1 |
| vertical | 35 | 46.6 | 6.8 | 23.6 | 3.7 |

It will be evident that the mislandings in all directions are approximately halved in this example by providing the external frame.

A demagnetization coil (not shown) is preferably arranged around the magnetic frame so as to demagnetize the frame when the tube is switched on.

Figure 4:
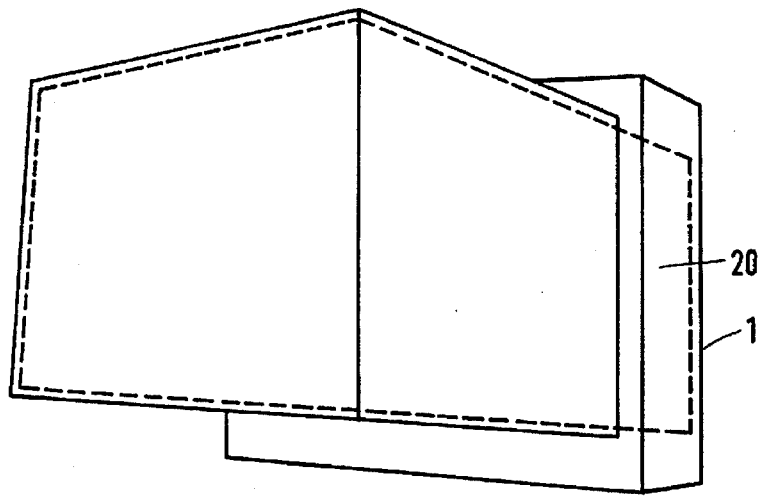
FIG. 4 is a perspective elevational view of an embodiment of a display having a shielded colour display tube according to the invention.

The bars of the magnetic frame may be arranged efficiently against the inner walls of a cabinet accommodating the display tube, like the cabinet 20 shown in FIG. 4.

Since the display screen is larger in width than in height, mislandings (due to the axial field) in the y-direction are larger than in the x-direction. In display tubes in which the phosphors are arranged in vertical rows, the y-mislandings are not important. However, the phosphors are arranged as dots in high-resolution tubes. Here, mislandings in the y-direction are as troublesome as in the x-direction. Since the y-mislandings are naturally larger because of the aspect ratio of the screen, this should require extra attention in these tubes. This also applies to tubes having a display screen with a 9:16 aspect ratio, which tubes are more elongate than the conventional display screens having a 3:4 aspect ratio.

In these cases the use of an external magnetic frame is thus of particular importance.

A shielding effect will generally be noticeable if the following condition:

$$\mu > \left( \frac{\left(a+\frac{c}{2}\right)\left(b+\frac{c}{2}\right)}{2S} \right)$$

is satisfied for a frame having the shape of a block as shown in FIG. 2. Here, c is the dimension of the rib of the block parallel to the direction of the magnetic field considered (in accordance with the Table) and a and b are the dimensions of the two ribs perpendicular thereto. S denotes the cross-section of the bars. At a value of the magnetic permeability μ which is ten times larger than the value indicated above, there will generally be saturation of the effect.

We claim:

1. A color display tube having an envelope and comprising means for generating electrons, a transparent window, a display screen having a pattern of phosphor elements on the inner surface of the window and means for directing electrons to the display screen, characterized in that the tube is present in an open arrangement of bars of soft magnetic material that shields the tube from the influence of the earth magnetic field and the arrangement being free from said bars in front of the display screen.

2. A color display tube of claim 1 wherein the sides of the arrangement are open.

3. A color display tube of claim 1 wherein the bars are arranged against inner walls of a cabinet accommodating the display tube.

4. A color display tube of claim 1 wherein the display screen has an aspect ratio of 9:16.

5. A color display tube having an envelope and comprising means for generating electrons, a transparent window, a display screen having a pattern of phosphor elements on the inner surface of the window and means for directing electrons to the display screen, characterized in that the tube is present in an open arrangement of interconnected bars of soft magnetic material that shields the tube from the influence of the earth magnetic field, the arrangement being free from said bars in front of the display screen.

6. A color display tube of claim 5 wherein the sides of the arrangement are open.

7. A color display tube of claim 5 wherein the bars constitute the ribs of an imaginary block.

8. A color display tube of claim 7 wherein the sides of the arrangement are open.

9. A color display tube of claim 5 wherein the bars are arranged against inner walls of a cabinet accommodating the display tube.

10. A color display tube of claim 5 wherein the display screen has an aspect ratio of 9:16.

* * * * *